(12) United States Patent
Hickox et al.

(10) Patent No.: US 6,362,741 B1
(45) Date of Patent: Mar. 26, 2002

(54) LEAK DETECTOR

(75) Inventors: Richard M. Hickox, Township of Ross; Frank Akers, III, Gibsonia; Carlo Edward Cuomo, Verona; Patrick A. Genco, Millvale; Wesley J. Mellon, Oakmont; John H. Reno, II, Valencia, all of PA (US); Roger Ramsey, Akron, OH (US)

(73) Assignee: Bacharach, Inc., Pittsburgh, PA (US)

( * ) Notice: Subject to any disclaimer, the term of this patent is extended or adjusted under 35 U.S.C. 154(b) by 0 days.

(21) Appl. No.: 09/875,498

(22) Filed: Jun. 6, 2001

(51) Int. Cl.⁷ .............................................. G08B 21/00
(52) U.S. Cl. ................... 340/605; 340/632; 340/691.6; 340/693.5; 340/636; 73/40.7
(58) Field of Search ................................ 340/605, 632, 340/691.1, 691.6, 693.5, 636; 73/23.2, 40.7; 324/464, 468, 455

(56) References Cited

U.S. PATENT DOCUMENTS

| | | | |
|---|---|---|---|
| 3,786,675 A | * 1/1974 | Delatorre et al. | 340/605 |
| 4,488,118 A | * 12/1984 | Jeffers et al. | 340/632 |
| 4,910,463 A | * 3/1990 | Williams, II et al. | 324/468 |
| 5,347,223 A | * 9/1994 | Krcma et al. | 340/632 |
| 5,351,037 A | * 9/1994 | Martell et al. | 340/605 |
| 5,889,199 A | * 3/1999 | Wong et al. | 73/40.7 |
| 6,182,497 B1 | * 2/2001 | Krajci | 340/632 |

* cited by examiner

Primary Examiner—Daniel J. Wu
(74) Attorney, Agent, or Firm—Webb Ziesenheim Logsdon Orkin & Hanson, P.C.

(57) ABSTRACT

A portable leak detector includes a housing having an inlet and an outlet each in fluid communication between an interior and an exterior of the housing. A gas sensor, having a property that changes in response to exposure of the gas sensor to one or more gases, is positioned in fluid communication with the interior of the housing via the inlet thereof. The leak detector includes a probe lamp, a plurality of first indicator lamps supported by the housing and a speaker supported by the housing. A controller supported by the housing is connected to detect the property of the gas sensor. The controller causes the probe lamp to flash at a first frequency, causes a first group of the plurality of first indicator lamps to illuminate, and/or causes the loudspeaker to chirp at a second frequency all as a function of a detected property of the gas sensor.

11 Claims, 5 Drawing Sheets

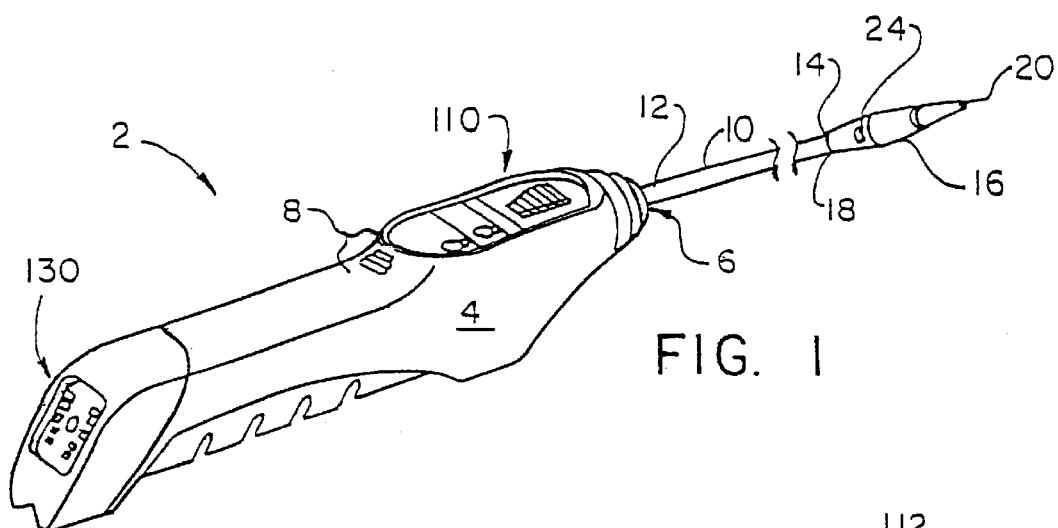
FIG. 1
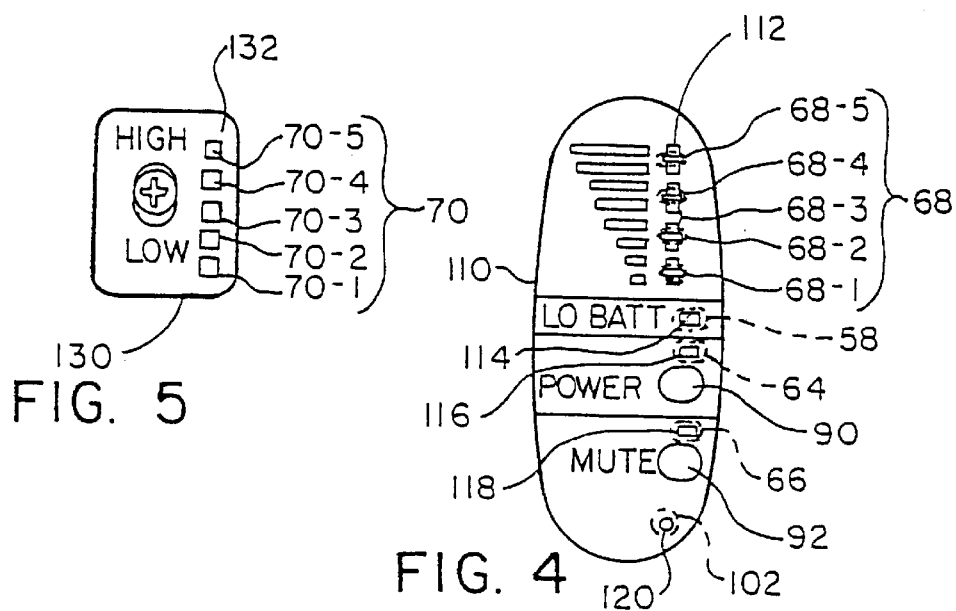
FIG. 5
FIG. 4
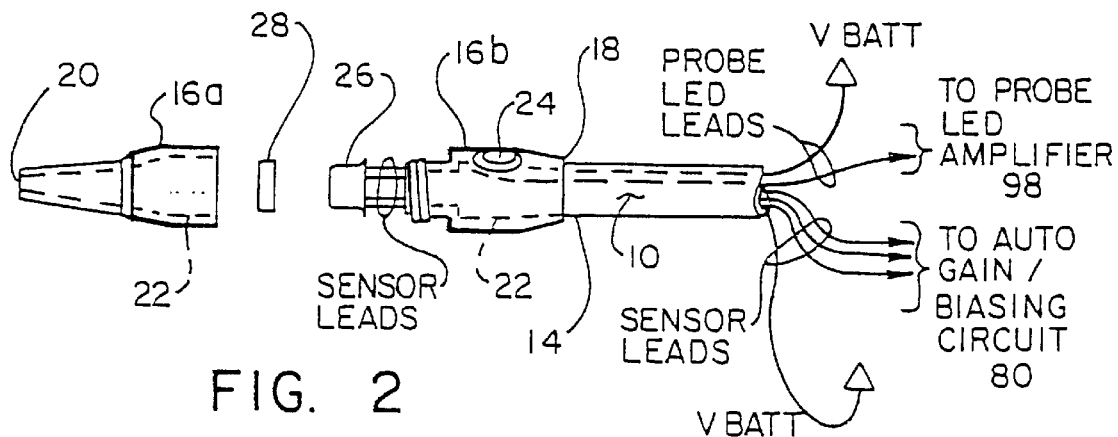
FIG. 2

LEAK DETECTOR

BACKGROUND OF THE INVENTION

1. Field of the Invention

The present invention relates to leak detectors and, more particularly, to portable leak detectors for detecting halogen gas.

2. Background Art

Prior art gas detectors generally, and halogen gas detectors specifically, are well-known in the art for detecting the presence of halogen gas in the atmosphere. Such gas detectors are commonly used to detect for leaks in refrigerant systems that are utilized to cool a living space, an interior of a vehicle, such as an automobile, an interior of a chamber, such as a refrigerator or freezer used for the cold storage of foods, and/or an environmental chamber utilized to expose test pieces or samples to low temperatures.

A problem with such prior art leak detectors is that they often require calibration to detect for the presence of halogen gas surrounding the refrigerant system. Since the concentration of halogen gas in the atmosphere may not be known, such calibration could increase the time to detect for the presence and location of a halogen gas leak thereby increasing the loss of halogen gas from the refrigerant system. In addition, these prior art gas detectors require an operator to utilize two hands to operate thereby making it difficult for the operator to maneuver the gas detector into a position to detect for the presence of a halogen gas leak. Furthermore, such prior art gas detectors typically required a long warm-up interval before accurate readings could be obtained. Still further, these prior art halogen gas sensors included no provision for controlling the power dissipated by its gas sensing element thereby reducing the effective life of the gas sensing element.

It is, therefore, an object of the present invention to overcome the above problems and others by providing a leak detector which can be manipulated with one hand, which enables changes in the concentration of halogen gas to be detected without operator intervention, which provides an auditory and/or visual indication of the change in concentration of halogen gas and which provides circuitry for controlling the power dissipated by the gas sensor of the leak detector in response to a resistance of a heating element of the gas detector changing with use. Still other objects of the present invention will become apparent to those of ordinary skill in the art upon reading and understanding the following detailed description.

SUMMARY OF THE INVENTION

Accordingly, we have invented a portable leak detector that includes a housing having an inlet in fluid communication between an interior and an exterior of the housing and an outlet in fluid communication between the interior and the exterior of the housing. A gas sensor having a property that changes in response to exposure of the gas sensor to one or more gases is disposed in fluid communication with the interior of the housing. The leak detector can include a probe lamp, a plurality of first indicator lamps supported by the housing and a speaker supported by the housing. A controller supported by the housing is connected to detect the property of the gas sensor. As a function of the detected property of the gas sensor, the controller causes the probe lamp to flash at a first frequency, causes a first group of the plurality of first indicator lamps to illuminate, and causes the loudspeaker to chirp at a second frequency.

The first and second frequencies are preferably the same. Moreover, causing the loudspeaker to chirp at the second frequency preferably includes selectively gating an audio frequency to the loudspeaker at the second frequency.

The leak detector can include a flexible tube and a sensor casing. The flexible tube has a proximal end connected to the inlet of the housing and a distal end. The sensor casing has a proximal end connected to the distal end of the tube, a distal end, and a fluid conduit extending therebetween. The sensor casing can be configured to receive the gas sensor in the fluid conduit and can be configured to support the probe lamp. The gas sensor and the probe lamp can be electrically connected to the controller via electrical conductors preferably received in an interior of the tube.

The leak detector can also include a plurality of second indicator lamps supported by the housing. The controller can cause a select group of the plurality of second indicator lamps to illuminate as a function of the property of the gas sensor detected by the controller.

A fan can be received in the housing in fluid communication with the inlet of the housing. The fan can be operated to urge the one or more gases into contact with the gas sensor, through the housing and through the outlet of the housing.

The leak detector can also include a power supply and an auto gain/biasing circuit received in the housing and connected to opposite sides of a heater element of the gas sensor. The auto gain/biasing circuit can operate to maintain the electrical power dissipated by the heater element constant regardless of variances in the resistance of the heater element.

We have also invented a portable leak detector having a housing with an inlet in fluid communication between an interior and an exterior of the housing and an outlet. A gas sensor having a property that changes in response to exposure of the gas sensor to one or more gases is disposed in fluid communication with the interior of the housing. The leak detector can include a plurality of first indicator lamps supported by the housing. A controller supported by the housing is connected to detect the property of the gas sensor. As a function of the detected property of the gas sensor, the controller causes a first group of the plurality of first indicator lamps to illuminate. In order to determine which group of first indicator lamps to illuminate, the controller detects the property of the gas sensor a plurality of times. Next, the controller determines from the plurality of detected properties a minimum property value, a maximum property value and a newest property value. Thereafter, the controller determines a property ratio. The property ratio is a ratio of the difference between the newest property value and the minimum property value over the difference between the maximum property value and the minimum property value. Thereafter, the controller illuminates the group of the first plurality of indicator lamps as a function of a product of the property ratio and a quantity of first indicator lamps.

The controller can also periodically detect the property of the gas sensor to obtain a new property value and can replace the oldest of the plurality of detected property values with the new property value. The controller can replace the minimum property value with the new property value if the new property value is less than the minimum property value and can replace the maximum property value with the new property value if the new property value is greater than the maximum property value. The controller can then determine another property ratio and can illuminate a second group of the plurality of first indicator lamps as a function of the other property ratio and the quantity of the plurality of the first indicator lamps. In the absence of a change between the new property ratio and the preceding property ratio, the quantity of the first group of the plurality of first indicator lamps and the quantity of the second group of the plurality of first indicator lamps are the same.

BRIEF DESCRIPTION OF THE DRAWINGS

FIG. 1 is a perspective view of a portable leak detector in accordance with the present invention;

FIG. 2 is an exploded, isolated view of the sensor casing and distal end of the flexible tube of the portable leak detector of FIG. 1;

FIG. 4 is a plan view of a control panel of the portable leak detector shown in FIG. 1;

FIG. 5 is a plan view of a battery cover of the portable leak detector shown in FIG. 1;

DETAILED DESCRIPTION OF THE PREFERRED EMBODIMENT

Figure 3A:
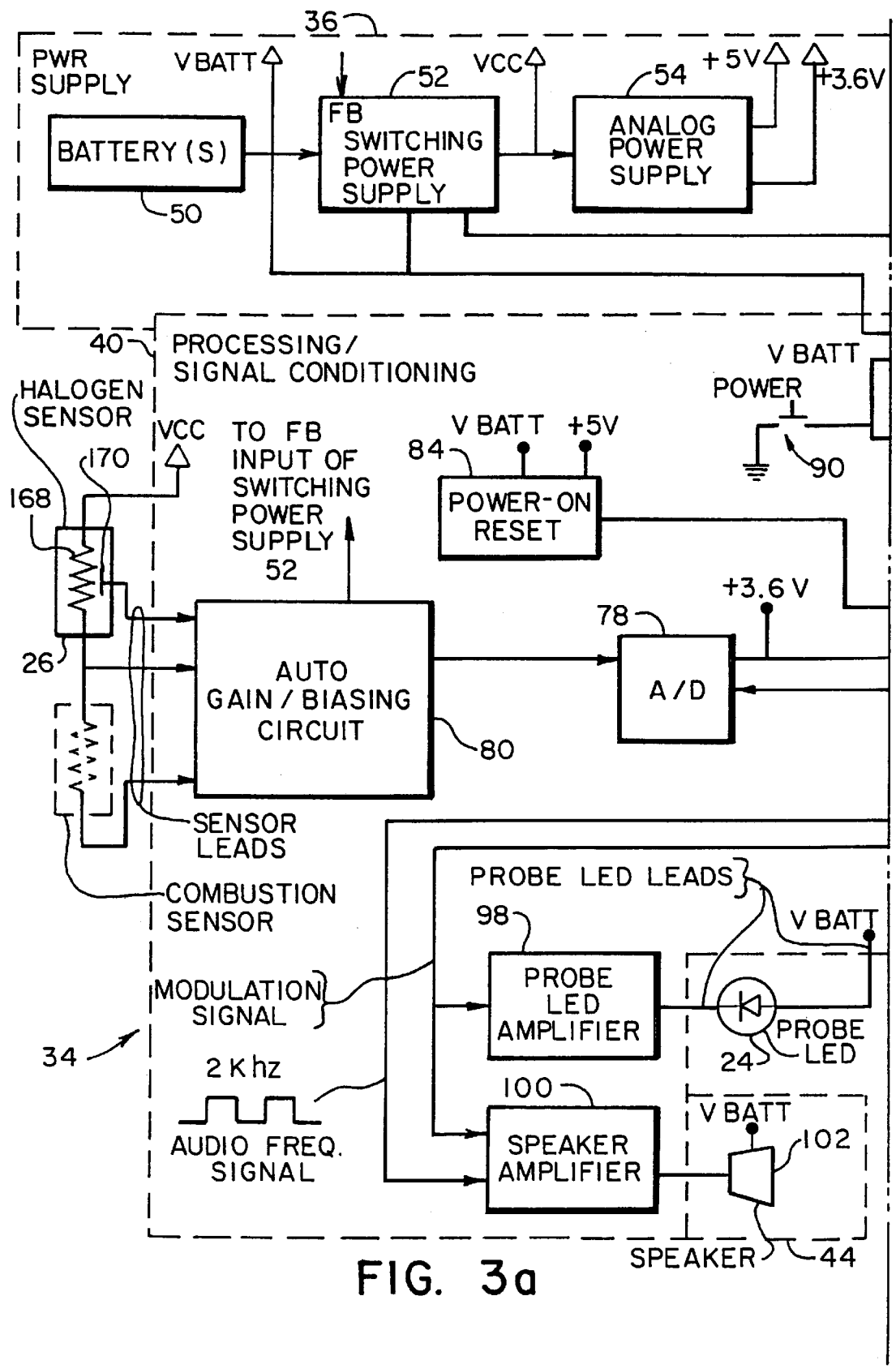
FIG. 3 is a block diagram of a controller of the portable leak detector shown in FIG. 1.

The present invention will be described with reference to the accompanying Figures wherein like reference numbers correspond to like elements.

With reference to FIG. 1, a portable leak detector 2 includes a housing 4 having an inlet 6 in fluid communication between an interior and an exterior of housing 4 and an outlet 8 in fluid communication between the interior and the exterior of housing 4. A flexible tube 10 has a proximal end 12 connected to inlet 6 of housing 4 and a distal end 14 opposite housing 4. Preferably, flexible tube 10 is formed from a spiral wound spring wire having a vinyl sheath thereover. The spring wire enables the flexible tube 10 to be bent to a desired shape and to retain the desired shape absent application of a sufficient bending force to the flexible tube 10. Tubes like flexible tube 10 are well-known in the art.

A sensor casing 16 has a proximal end 18 connected to distal end 14 of flexible tube 10 and a distal end 20 opposite flexible tube 10. Sensor casing 16 includes a fluid conduit 22 (shown in phantom in FIG. 2) which extends between proximal end 18 and distal end 20. A probe lamp 24, such as an LED, is supported by sensor casing 16 for viewing from an exterior of sensor casing 16.

With reference to FIG. 2, and with continuing reference to FIG. 1, sensor casing 16 includes a first part 16a and a second part 16b configured to mate together. A gas sensor 26 can be positioned in fluid conduit 22 to detect for the presence of one or more halogen gases flowing therethrough. A filter 28 can also be positioned in fluid conduit 22 between gas sensor 26 and distal end 20 to filter particles of a desired size or larger from the one or more gases.

Gas sensor 26 has a property, e.g., resistance, that changes in response to exposure of the gas sensor 26 to the one or more gases. An example of a gas sensor 26 suitable for detecting halogen gas is disclosed in U.S. Pat. No. 5,932,176 to Yannopoulos et al., which is incorporated herein by reference.

With reference to FIG. 3, and with continuing reference to FIGS. 1 and 2, portable leak detector 2 includes inside housing 4 a controller 34 which includes a power supply section 36, a fan section 38, a processing/signal conditioning section 40, a lamp or LED section 42 and a speaker section 44.

The power supply section 36 includes one or more replaceable batteries 50 which output a voltage VBATT to a switching power supply 52. Switching power supply 52, preferably a Linear Technology LT1304C88 DC-to-DC converter, converts VBATT into a voltage VCC which is supplied to an analog power supply 54. Analog power supply 54 converts VCC into a +5 volt output (+5v) and a +3.6 volt output (+3.6v). The voltages VBATT, VCC, +5v and +3.6v are supplied to the various components and circuits of controller 34. Switching power supply 52 has a control output connected to a low battery detect circuit 56. In response to the potential of VBATT decreasing below a predetermined voltage, switching power supply 52 outputs a suitable control signal to low battery detect circuit 56. In response to receiving this suitable control signal, low battery detect circuit 56 causes current to flow from the +5v output of analog power supply 54 through a low battery LED 58. In response to current flowing therethrough, low battery LED 58 illuminates thereby providing a visual indication that the one or more batteries 50 require charging or replacement.

Fan section 38 includes a fan 60 electrically connected between the +5v output of analog power supply 54 and a reference ground. Fan 60 is received in housing 4 in fluid communication with an interior of flexible tube 10, inlet 6 of housing 4 and outlet 8 of housing 4. In response to the operation thereof, fan 60 urges one or more gases from distal end 20 of sensor casing 16, into contact with gas sensor 26 through the interior of flexible tube 10, through inlet 6 of housing 4 and through outlet 8 of housing 4.

Processing/signal conditioning section 40 includes a microprocessor 76 connected to receive a digital output of an analog-to-digital converter (A/D) 78. An auto gain/biasing circuit 80 is connected between gas sensor 26 and an analog input of A/D 78. Microprocessor 76 is connected to control an LED driver circuit 82 which is connected to control illumination of a power LED 64, a mute LED 66 and a plurality of first indicator LEDs 68 (68-1 through 68-5) and a plurality of second indicator LEDs 70 (70-1 through 70-5) of LED section 42. A power-on reset circuit 84 is connected to microprocessor 76 and is configured to reset microprocessor 76 at battery installation. A power-up flip flop 86 has a pair of complementary outputs Q and $\overline{Q}$ which are utilized to cause switching power supply 52 to supply or withhold VCC from analog power supply 54 and to control an LED power control circuit 88 to supply VBATT to LED section 42, respectively. Power-up flip flop 86 has a control input C connected to VBATT and a power switch 90. The terminal of power switch 90 opposite control input C is connected to the reference ground. A mute switch 92 and a capacitor 94 are connected in parallel between the Q output of power-up flip flop 86 and the reference ground. A resistor 96 is connected between the Q output of power-up flip flop 86 and the mute switch 92. Microprocessor 76 has a modulated signal output connected to provide a modulated signal to a probe LED amplifier 98 and a speaker amplifier 100. Microprocessor 76 also has an audio frequency output which supplies an audio frequency signal, preferably a 2 KHz square wave signal, to speaker amplifier 100. While FIG. 3 shows microprocessor 76 applying one modulation signal to both probe LED amplifier 98 and speaker amplifier 100, microprocessor 76 can include two outputs for providing separately controlled modulation signals to probe LED amplifier 98 and speaker amplifier 100.

As shown in FIG. 3, probe LED 24 is connected between VBATT and an input of probe LED amplifier 98 via probe LED leads. Gas sensor 26 is connected between VCC and auto gain/biasing circuit 80 via sensor leads. Speaker section 44 includes speaker 102 which is connected to an output of speaker amplifier 100.

During power-up of controller 34 in response to the momentary activation of power switch 90, the Q output of power-up flip flop 86 changes state and supplies a suitable signal to switching power supply 52 and microprocessor 76. In response to receiving this suitable signal from the Q output of power-up flip flop 86, switching power supply 52 commences supplying VCC to analog power supply 54 which, in turn, commences supplying +5v and +3.6v. Thereafter, in response to activation of power switch 90, the Q output of power-up flip flop 86 changes state thereby causing switching power supply 52 to terminate supplying VCC to analog power supply 54 which, in turn, terminates supplying +5v and +3.6v. Hence, by sequentially activating power switch 90, the supply of VCC, +5v and +3.6v can be commenced or terminated.

In response to analog power supply 54 supplying +5v, fan 60 commences drawing one or more gases into contact with gas sensor 26. In response to analog power supply 54 supplying +3.6v, microprocessor 76 initializes.

Moreover, in response to sequential activation of power switch 90, LED power control circuit 88 sequentially connects and disconnects VBATT from LED section 42 via the changing state of the $\overline{Q}$ output of power-up flip flop 86. Switching power supply 52, power-up flip flop 86 and LED power control circuit 88 coact so that microprocessor 76 initializes when LED power control circuit 88 connects VBATT to LED section 42. Once initialized, microprocessor 76 causes LED driver circuit 82 to illuminate power LED 64, extinguish mute LED 66, extinguish each of the plurality of first indicator LEDs 68 and extinguish each of the plurality of second indicator LEDs 70. The operation of controller 34 after initialization will be described in greater detail hereinafter with respect to FIG. 6.

With reference to FIG. 4, housing 4 includes a control panel 110 having power switch 90, mute switch 92, a plurality of indicator windows 112, a low battery window 114, a power window 116, a mute window 118 and a speaker aperture 120. Preferably, the plurality of indicator windows 112 is positioned between the plurality of first indicator LEDs 68 and an exterior of housing 4 to permit viewing of the plurality of first indicator LEDs 68 through the plurality of indicator windows 112. Preferably, the number of indicator windows 112 is greater than the number of first indicator LEDs 68 and each first indicator LED 68 is positioned so that each adjacent pair of indicator windows 112 will be illuminated by at least one of the first indicator LEDs 68. This arrangement of indicator windows 112 and first indicator LEDs 68 enhances the perceived sensitivity of portable leak detector 2.

Low battery LED 58, power LED 64 and mute LED 66 are positioned in alignment with low battery window 114, power window 116 and mute window 118, respectively, for viewing therethrough from an exterior of housing 4. Similarly, speaker 102 is positioned in alignment with speaker aperture 120 to permit sound produced by speaker 120 to be audible outside of housing 4.

With reference to FIG. 5, a battery cover 130 covers a battery holder (not shown) received in an end of housing 4 opposite inlet 6. Preferably, battery cover 130 includes a plurality of indicator windows 132 which is positioned between the plurality of second indicator LEDs 70 and an exterior of housing 4 to permit viewing of the plurality of second indicator LEDs 70 through the plurality of indicator windows 132. Preferably, the number of indicator windows 132 is greater than the number of second indicator LEDs 70 and each second indicator LED 70 is positioned so that each adjacent pair of indicator windows 132 will be illuminated by at least one of the second indicator LEDs 70. Like the indicator windows 112 and the plurality of first indicator LEDs 68 above, this arrangement of indicator windows 132 and second indicator LEDs 70 enhances the perceived sensitivity of portable leak detector 2.

Figure 6:
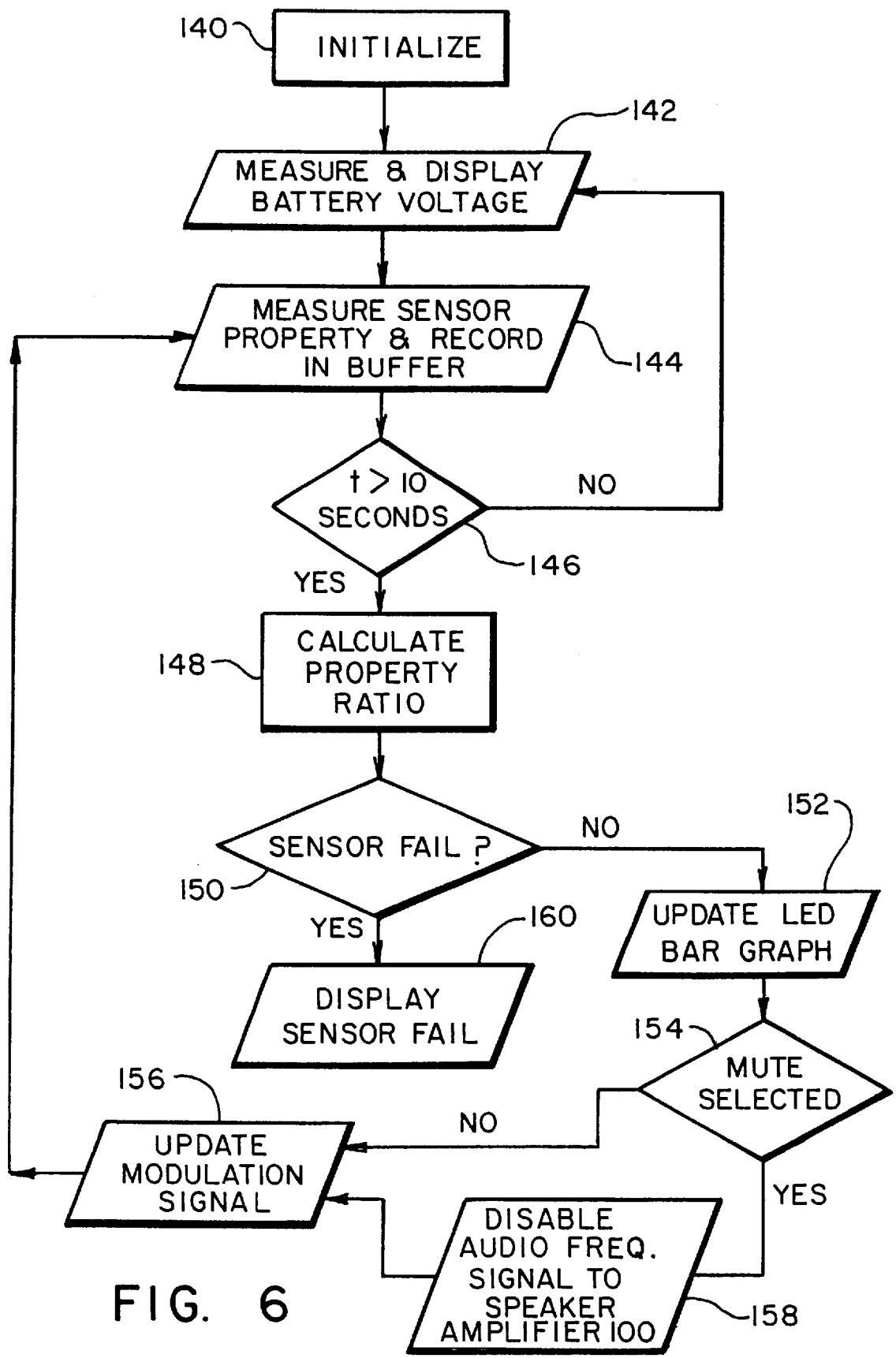
FIG. 6 is a flow chart of the operation of the controller shown in FIG. 3.

With reference to FIG. 6, and with continuing reference to all previous Figures, the operation of controller 34 will now be described. Beginning from a state where VCC, +5v and +3.6v are not being supplied to the various components of controller 34, activation of power switch 90 causes switching power supply 52 to output VCC. In response to receiving VCC, analog power supply 54 outputs +5v and +3.6v. In response to receiving +3.6v from analog power supply 54, microprocessor 76 resets and, thereafter, commences operation in accordance with an internally stored software program. This software program includes step 140 wherein microprocessor 76 initializes its inputs/outputs and its internal registers to a starting condition. Upon initialization, microprocessor 76 causes LED driver circuit 82 to illuminate power LED 64, mute LED 66, first indicator LEDs 68 and second indicator LEDs 70 for a brief interval. At step 142, microprocessor 76 measures the potential of VBATT and displays this potential utilizing the first indicator LEDs 68 and the second indicator LEDs 70. If VBATT is at or above a maximum desired potential, e.g., 5 volts, microprocessor 76 will cause LED driver circuit 82 to illuminate first indicator LEDs 68-1 through 68-5 and second indicator LEDs 70-1 through 70-5. If VBATT is at four-fifths (⅘) of the maximum desired potential, microprocessor 76 causes LED driver circuit 82 to only illuminate first indicator LEDs 68-1 through 68-4 and second indicator LEDs 70-1 through 70-4. Similarly, microprocessor 76 will illuminate lesser numbers of the first indicator LEDs 68 and the second indicator LEDs 70 in response to decreasing values of VBATT. Preferably, microprocessor 76 rounds fractional percentages of the maximum desired potential of VBATT and illuminates a number of first indicator LEDs 68 and second indicator LEDs corresponding to the rounded fractional percentage. In this manner, the number of the first indicator LEDs 68 and the second indicator LEDs illuminated by microprocessor 76 in step 142 will essentially correspond to the current potential of VBATT.

In step 144, microprocessor 76 measures a property of gas sensor 26 via auto gain/biasing circuit 80 and A/D 78 and records the measured property in an internal buffer of microprocessor 76 which preferably has 75 registers for storing 75 measurements of the property of the gas sensor 26. More or less registers can also be utilized. Next, in step 146, microprocessor 76 determines if 10 seconds has elapsed since step 140. If not, microprocessor 76 repeats steps 142–146, preferably every 133 milliseconds. After the initial 10 seconds of operation, the internal buffer registers of microprocessor 76 will include 75 initial measurements of the sensor property. At step 148, microprocessor 76 determines from the 75 initial measurements of the property of the gas sensor 26 a maximum property value, a minimum property value and a most recent, or newest, property value. Microprocessor 76 then determines a property ratio from the newest property value, the minimum property value and the maximum property value utilizing the following Equation 1:

$$\frac{\text{(newest property value} - \text{minimum property value)}}{\text{(maximum property value} - \text{minimum property value)}} \quad \text{(EQ 1)}$$

Next, in step 150, microprocessor 76 determines if there has been a failure reading the property of gas sensor 26. If so, microprocessor 76 branches to step 160 wherein a suitable visual signal is provided indicative of a failure of gas sensor 26. Such a signal can include, for example, lighting certain LEDs 68 and/or 70, e.g., 68-3 and 70-3, with the remaining LEDs 68 and 70 remaining extinguished. If, however, microprocessor 76 determines that gas sensor 26 is operative, microprocessor 76 branches to step 152 wherein the plurality of first indicator LEDs 68 and the plurality of second indicator LEDs 70 are updated as a function of the detected property of the gas sensors 26. More specifically, in step 152, microprocessor 76 illuminates a group of first indicator LEDs 68 as a function of a product of the property ratio and the number of first indicators LEDs 68 and illuminates a group of the second indicator LEDs 70 as a function of a product of the property ratio and the number of second indicator LEDs 70. Thus, for example, if the property ratio is ⅗, first indicator LEDs 68-1 through 68-3 and second indicator LEDs 70-1 through 70-3 are illuminated. Preferably, microprocessor 76 rounds fractional percentages of the property ratio as necessary so that the group of first indicator LEDs 68 and the group of second indicator LEDs 70 illuminated by microprocessor 76 essentially correspond to the then current fractional percentage of the property ratio.

In step 154, microprocessor 76 determines if mute switch 92 is activated. If not, microprocessor 76 branches to step 156 wherein the frequency of the modulation signal supplied by microprocessor 76 to probe LED amplifier 98 and speaker amplifier 100 is updated as a function of the property ratio. Specifically, if the property ratio is 1, microprocessor 76 adjusts the frequency of the modulation signal to a predetermined maximum frequency that corresponds to a rapid ON/OFF illumination of probe LED 24 that can be readily perceived by the human eye. If the property ratio is ⅗, the ON/OFF illumination of probe LED 24 decreases, preferably to ⅗ of the predetermined maximum frequency. The predetermined maximum frequency of the modulation signal also corresponds to a rapid chirp rate output by speaker 102. More specifically, the modulation signal is preferably a square wave signal. In response to receiving the positive or negative peak value of each cycle of the modulation signal, speaker amplifier 100 gates the audio frequency signal to speaker 102. Thus, in response to receiving the audio frequency signal and the modulation signal having the predetermined maximum frequency, speaker amplifier 100 gates the audio frequency signal to speaker 102 at the predetermined maximum frequency thereby causing speaker 102 to produce audio frequency sounds, or chirps, at the predetermined maximum frequency. If the frequency of the modulation signal decreases to, for example, ⅗ of the predetermined maximum frequency speaker amplifier 100 gates the audio frequency signal to speaker 102 at ⅗ of the predetermined maximum frequency. Thus, the rate at which speaker 102 produces sounds, or chirps, at the audio frequency is related to the frequency of the modulation signal. Alternatively, microprocessor 76 can supply to probe LED amplifier 98 and speaker amplifier 100 separate modulation signals that can be independently adjusted to have the same or different frequency. In this manner, probe LED 24 and speaker 102 can be operated at the same frequency.

If, in step 154, microprocessor 76 determines mute switch 92 as activated, microprocessor 76 branches to step 158 wherein microprocessor 76 terminates supplying the audio frequency signal to speaker amplifier 100. Thereafter, microprocessor 76 branches to step 156 and updates the modulation signal as discussed above. Since the audio frequency signal to speaker amplifier 100 is disabled, speaker 102 outputs no sound in response to the changing frequency of the modulation signal. The supply of the audio frequency signal to speaker amplifier 100 can be re-enabled by activating mute switch 92 serially.

After completing step 156, microprocessor 76 repeats steps 144–156, including step 158 if mute switch 92 is selected, at a predetermined rate, preferably, every 133 milliseconds. Since each buffer register of microprocessor 76 received a measured property of gas sensor 26 during the initial 10 seconds of operation, when microprocessor 76 repeats steps 144–156, each new measured sensor property value is recorded in the buffer register containing the oldest measured property value. Since microprocessor 76 repeats steps 144–156 every 133 milliseconds, all 75 buffer registers utilized to store measured sensor property values are overwritten with new data every 10 seconds. Thus, the sensitivity of controller 34 is automatically adjusted based on the measured property values over the most recent 10 second interval. In this manner, changes in the concentration of the one or more gases can be detected and made perceptible utilizing probe LED 24, LEDs 68 and 70 and, if enabled, speaker 102.

The preferred embodiment of the present invention discussed above includes a plurality of first indicator LEDs 68 and a plurality of second indicator LEDs 70. However, the plurality of first indicator LEDs 68 or the plurality of second indicator LEDs 70 may be omitted as desired. Moreover, while the present invention has been described as having indicator LEDs 68 and 70, probe LED 24 and speaker 102, other preferred embodiments of the invention can include any combination of indicator LEDs 68, indicator LEDs 70, probe LED 24 and/or speaker 102. Furthermore, while each plurality of indicator LEDs 68 and 70 is shown as having 5 LEDs, each plurality of indicator LEDs 68, 70 can include more than or less than 5 LEDs as desired.

As shown in FIG. 3, gas sensor 26 includes a heater element 168 which is utilized to heat a detector element 170. In prior art leak detectors, the power dissipated by heater element 168 varied in response to changes in the resistance of heater element 168. More specifically, with use, the resistance of heater element 168 increases. For a constant value of VCC, increases in the resistance of heater element 168 decreased the amount of power dissipated thereby which adversely affected the detection of the one or more gases by detector element 170 and decreased the useful life of gas sensor 26. In the present invention, auto gain/biasing circuit 80 operates to maintain the power dissipated by heater element 168 constant regardless of changes in the resistance thereof. In this manner, as the resistance of heater element 168 changes with use, the power dissipated thereby remains constant so that the detection of one or more gases by detector element 170 is more consistent and is unaffected by variations in heater resistance and the maximum useful life of gas sensor 26 is realized.

Figure 7:
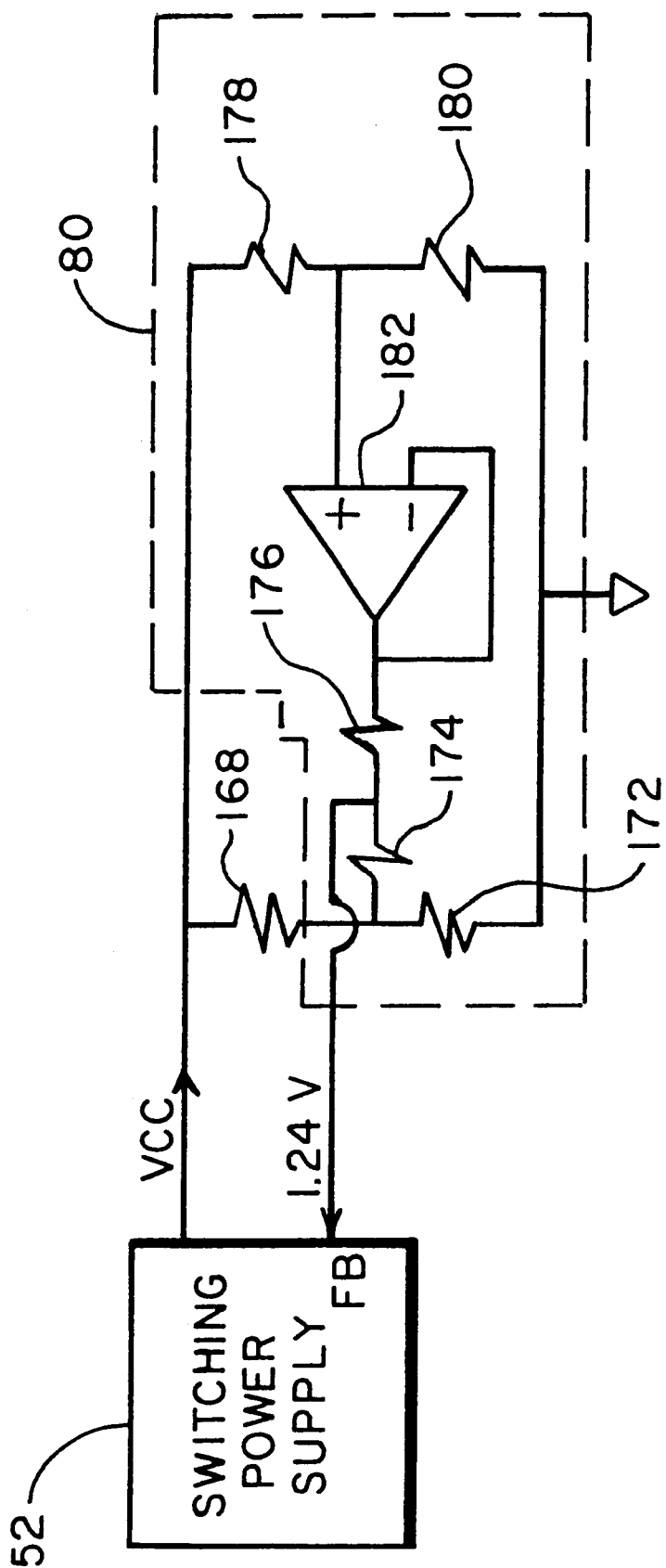
FIG. 7 is a schematic drawing of the auto gain/biasing circuit connected to the switching power supply and the heater resistor of the gas sensor shown in FIG. 3.

More specifically, as shown in FIG. 7, auto gain/biasing circuit 80 includes resistors 172–180 connected to bias the inputs and outputs of operational amplifier 182. A node formed by resistors 172 and 174 is connected to VCC via heater element 168 of gas sensor 26. The node formed by resistors 174 and 176 is connected to a feedback pin FB of switching power supply 52. In operation, switching power supply 52 regulates VCC such that feedback pin FB is driven to a predetermined feedback voltage, e.g., about 1.24v. Auto gain/biasing circuit 80 sums together a fraction of VCC along with a voltage proportional to the current flowing through heater element 168 to generate the feedback voltage. In addition, the voltage developed across resistor 172 causes auto gain/biasing circuit 80 to adjust the bias voltage across heater element 168 to maintain the voltage across heater element 168 substantially constant.

As can be seen, the present invention enables changes in the relative concentration of one or more gases to be detected and provides an auditory and/or visual indication of such change without the need for a quantitative measurement of the concentration of the one or more gases. The ability to detect relative change in the concentration of one or more gases enables the source of a leak to be detected without making manual sensitivity adjustments or without regard to the background level of one or more gases in the area surrounding the leak. In addition, the present invention provides circuitry which maintains the power dissipated by the gas sensor of the leak detector constant regardless of changes to the resistance of a heating element of the gas detector changing over time and with use.

The present invention has been described with reference to the preferred embodiment. Obvious modifications and alterations will occur to others upon reading and understanding the preceding detailed description. For example, while described in connection with a gas sensor for detecting halogen gas, gas sensors having a detector element and a heater element that coact in the above-described manner to detect for the presence of other gases, such as combustible gases, can also be used. It is intended that the invention be construed as including all such modifications and alterations insofar as they come within the scope of appended claims or the equivalents thereof.

We claim:

1. A portable leak detector comprising:
    a housing having an inlet in fluid communication between an interior and an exterior of the housing and an outlet in fluid communication between the interior and the exterior of the housing;
    a gas sensor in fluid communication with the interior of the housing via the inlet thereof, the gas sensor having a property that changes in response to exposure of the gas sensor to one or more gases;
    a probe lamp,
    a plurality of first indicator lamps supported by the housing;
    a speaker supported by the housing; and
    a controller supported by the housing and connected to detect the property of the gas sensor, wherein the controller, as a function of the detected property of the gas sensor (i) causes the probe lamp to flash at a first frequency, (ii) causes a first group of the plurality of first indicator lamps to illuminate, and/or (iii) causes the speaker to chirp at a second frequency.

2. The leak detector as set forth in claim 1, wherein the first frequency and the second frequency are the same.

3. The leak detector as set forth in claim 1, wherein causing the loudspeaker to chirp at the second frequency includes selectively gating an audio frequency to the loudspeaker at the second frequency.

4. The leak detector as set forth in claim 1, further including:
    a flexible tube having a proximal end connected to the inlet of the housing and a distal end; and
    a sensor casing having a proximal end connected to the distal end of the tube, a distal end and a fluid conduit extending therebetween, wherein:
        the sensor casing is configured to receive the gas sensor in the fluid conduit; and
        the sensor casing is configured to support the probe lamp.

5. The leak detector as set forth in claim 4, wherein the gas sensor and the probe lamp are electrically connected to the controller via electrical conductors received in an interior of the flexible tube.

6. The leak detector as set forth in claim 1, further including a plurality of second indicator lamps supported by the housing, wherein the controller causes a group of the plurality of second indicator lamps to illuminate as a function of the property of the gas sensor detected by the controller.

7. The leak detector as set forth in claim 1, further including a fan received in the housing and in fluid communication with the inlet of the housing, wherein the fan is operable for urging the one or more gases into contact with the gas sensor, through the housing and through the outlet of the housing.

8. The leak detector as set forth in claim 1, further including a power supply and an auto gain/biasing circuit received in the housing, wherein:
    the gas sensor includes a heater element connected between the power supply and the auto gain/biasing circuit; and
    the auto gain/biasing circuit operates to maintain the electrical power dissipated by the heater element constant regardless of variances in the resistance of the heater element.

9. A portable leak detector comprising:
    a housing having an inlet in fluid communication between an interior and an exterior of the housing and an outlet in fluid communication between the interior and the exterior of the housing;
    a gas sensor in fluid communication with the interior of the housing, the gas sensor having a property that changes in response to exposure of the gas sensor to one or more gases;
    a plurality of first indicator lamps;
    a controller supported by the housing and connected to detect the property of the gas sensor, wherein the controller:
        detects the property of the gas sensor a plurality of times;
        determines from the plurality of detected properties (i) a minimum property value, (ii) a maximum property value and (iii) a newest property value;
        determines a property ratio utilizing the following Equation 1;

$$\frac{(\text{newest property value} - \text{minimum property value})}{(\text{maximum property value} - \text{minimum property value})} \quad (EQ\ 1)$$

and illuminates a first group of the plurality of first indicator lamps as a function of a product of the property ratio and a quantity of first indicator lamps.

10. The leak detector as set forth in claim 9, wherein the controller:
    periodically detects the property of the gas sensor to obtain a new property value;
    replaces the oldest property value with the new property value;

replaces the minimum property value with the new property value if the new property value is less than the minimum property value;

replaces the maximum property value with the new property value if the new property value is greater than the maximum property value;

determines another property ratio utilizing Equation 1; and illuminates a second group of the plurality of first indicator lamps as a function of a product of the other property ratio and the quantity of first indicator lamps.

11. The leak detector as set forth in claim 10, wherein the quantity of the first group of first indicator lamps and the quantity of the second group of first indicator lamps are the same.

* * * * *

UNITED STATES PATENT AND TRADEMARK OFFICE
CERTIFICATE OF CORRECTION

PATENT NO.     : 6,362,741 B1
DATED          : March 26, 2002
INVENTOR(S)    : Richard M. Hickox et al.

Figure 3B:
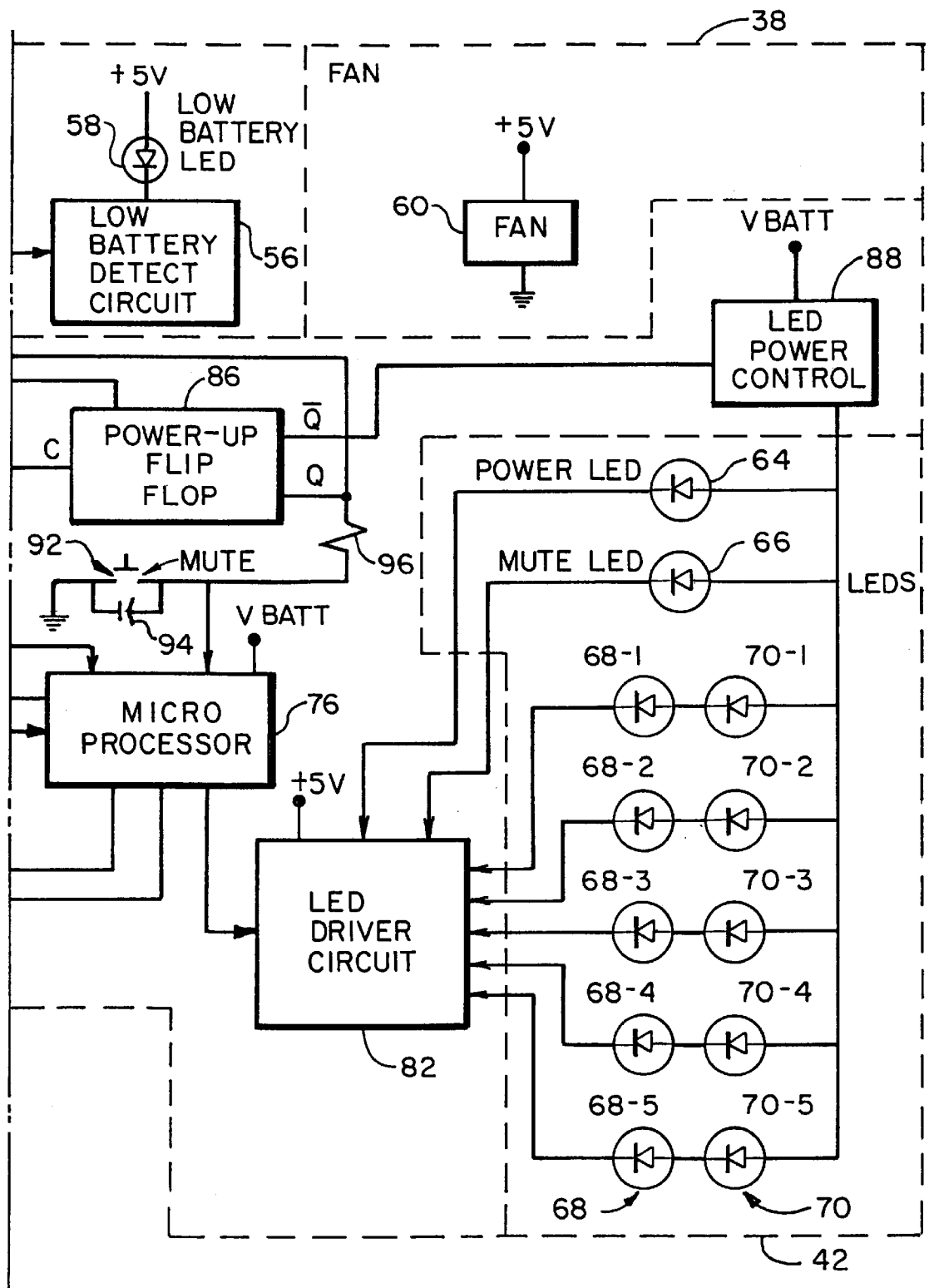

It is certified that error appears in the above-identified patent and that said Letters Patent is hereby corrected as shown below:

Column 3,
Line 14, "FIG. 3 is" should read -- FIGS. 3a-3b are --.
Lines 22, 25 and 66, "FIG. 3" should read -- FIGS. 3a-3b --.

Column 4,
Lines 62-63 "While FIG. 3 shows" should read -- While FIGS. 3a-3b show --.

Column 5,
Line 1, "FIG. 3" should read -- FIGS. 3a-3b --.

Column 8,
Line 43, "FIG. 3" should read -- FIGS. 3a-3b --.

Signed and Sealed this

Second Day of July, 2002

Attest:

JAMES E. ROGAN
Attesting Officer      Director of the United States Patent and Trademark Office